United States Patent [19]

Tanaka et al.

[11] Patent Number: 4,704,545
[45] Date of Patent: Nov. 3, 1987

[54] SWITCHED CAPACITOR RECTIFIER CIRCUIT

[75] Inventors: Yutaka Tanaka; Hidemi Iseki, both of Kawasaki, Japan

[73] Assignee: Kabushiki Kaisha Toshiba, Kawasaki, Japan

[21] Appl. No.: 751,551

[22] Filed: Jul. 3, 1985

[30] Foreign Application Priority Data

Aug. 28, 1984 [JP] Japan ............... 59-178634

[51] Int. Cl.$^4$ ............ H03K 5/22; H03K 5/153; H03B 19/60; G06G 7/18
[52] U.S. Cl. ................... 307/236; 307/490; 307/363; 328/26; 328/127
[58] Field of Search ............ 307/236, 360, 363, 490; 328/26, 126, 127; 330/9

[56] References Cited

U.S. PATENT DOCUMENTS

| | | | |
|---|---|---|---|
| 3,585,487 | 6/1971 | McNally | 307/360 |
| 4,109,308 | 8/1978 | Rödel | 328/26 |
| 4,313,096 | 1/1982 | Fleischer | 333/173 |
| 4,370,632 | 1/1983 | Allgood et al. | 307/246 |
| 4,425,550 | 1/1984 | Smith et al. | 330/107 |
| 4,520,283 | 5/1985 | Sasaki et al. | 307/246 |
| 4,575,649 | 3/1986 | Gardiner et al. | 328/26 |
| 4,608,464 | 8/1986 | Morikawa et al. | 179/170.2 |

OTHER PUBLICATIONS

Patents Abstracts of Japan, vol. 8, No. 155 (E-256) [1592], Jul. 19th, 1984; and JP-A-59 56 870, (Y. Tanaka) 2/4/84.
Electronics, Aug. 3, 1970, p. 76, New York, US; L. Accardi: "Diode-Switched FET's Recitify the Full Wave".

Primary Examiner—Stanley D. Miller
Assistant Examiner—B. P. Davis
Attorney, Agent, or Firm—Finnegan, Henderson, Farabow, Garrett and Dunner

[57] ABSTRACT

A rectifier circuit is disclosed in which the levels of an input signal and a reference signal are compared, and the polarity of the equivalent resistor is set at positive or negative depending on the result of the comparison. The equivalent resistor is connected, as an input resistor, to a differential amplifier. A feedback resistor is connected between the input and output of the differential amplifier. This arrangement enables the rectifier circuit, with only a single differential amplifier, to perform the rectifying operation with a gain.

14 Claims, 17 Drawing Figures

FIG. 6A  A 
FIG. 6B  B 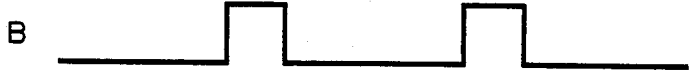
FIG. 7
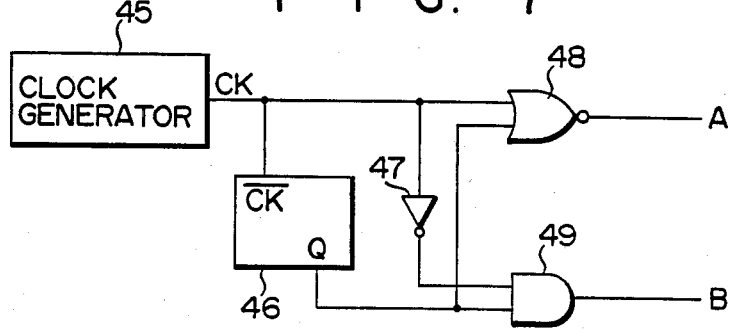
FIG. 8A  CK 
FIG. 8B  Q 
FIG. 8C  A 
FIG. 8D  B 

SWITCHED CAPACITOR RECTIFIER CIRCUIT

BACKGROUND OF THE INVENTION

The present invention relates to a rectifier circuit for the analog signal.

In manufacturing MOS integrated circuits, it is technically difficult to manufacture rectifying circuits. Japanese Patent Application No. 57-165364 discloses a solution to this problem, although it is unsatisfactory. This application will be given referring to FIG. 1. As shown, a MOS transistor Q1 as a first switch element is connected between an input terminal 12 of the rectifier circuit and the inverting input terminal of an operational amplifier 23. An inverter NOT1 (level detector) and another inverter NOT2 are connected in series between the input terminal 12 and the gate electrode of the transistor Q1. An operational amplifier 24 is connected at the inverting input terminal to the input terminal 12 through a resistor R5. The operational amplifier 24 is further connected at the noninverting input terminal to a reference potential generator 10 made up of transistors Q2 and Q3. These transistors Q2 and Q3 are connected in series between a power source VDD and ground. The potential at the output terminal of the operational amplifier 24 is fed back to the inverting input terminal through a resistor R6. A MOS transistor Q4 as a second switching element is connected between a junction point between the transistor Q1 and a resistor R3, and the output of the operational amplifier 24. The transistor Q4 thus connected is controlled by the output signal of the inverter NOT1. The output terminal of the reference potential generator 10 is connected to the noninverting input terminal of the operational amplifier 23. The output potential of the amplifier 23 is fed back to the inverting input terminal through a resistor R4. The output terminal of the amplifier 23 is connected to the output terminal of the whole circuit.

In the rectifier circuit thus arranged, when the AC input signal IN is higher in level than the threshold voltage of the inverter NOT1, the output signal of the inverter NOT1 is "L" in logical level, and the output signal of the inverter NOT2 is "H" in logical level. Therefore, the transistor Q1 is in the on-state and the transistor Q4 is in the off-state. The input signal IN passes through the transistor Q1, and is amplified by the operational amplifier 23, and transmitted to the output terminal 13 of the rectifier circuit. When the level of the AC input signal falls below the threshold voltage of the inverter NOT1, the transistor Q1 is in the off-state and the transistor Q4 is in the on-state. The operational amplifier 24, together with the resistors R5 and R6, forms an inverting amplifier. If the resistors R3 and R4 are selected to be equal in resistance, the operational amplifier 24 produces a signal inverted in polarity with respect to a reference potential. The inverted signal is passed through the transistor Q4, and further amplified by the operational amplifier 23, and transmitted to the output terminal 13. The output signal OUT from the output terminal 13 is the full-wave rectified signal of the AC input signal IN.

For the full-wave rectification by the above circuit, the amplification of the operational amplifier 24 is ideally 0 dB (gain 1). If not zero dB, the waveform of the output signal OUT is not exactly the rectified one. The factor to determine the amplification of the operational amplifier 24 is a ratio of the input resistance and the output resistance, R6/R5. To obtain the gain=1, the resistors R5 and R6 must be equal to each other, R5=R6. Actually, however, it is very difficult to manufacture these resistors so they have equal resistances. If the resistors are manufactured by the integrated circuit technology, a variation in the resistance of these resistors R5 and R6 is not small. To obtain a rectified wave with a satisfactorily large amplitude, at least two differential amplifiers are required. To form an operational amplifier with the 0-dB amplification, it is required to set the input resistor R5 and the feedback resistor R6 at relatively large resistances. From the standpoint of the IC technology, this is undesirable, because a larger chip area is required for the circuit integration.

SUMMARY OF THE INVENTION

Accordingly, an object of the present invention is to provide a rectifier circuit which requires a relatively small area of an IC chip, and improves its performance.

In a rectifier circuit of the present invention, an input signal is compared in level with a reference signal. On the basis of the result of the comparison, it is determined as to whether the polarity of an equivalent resistor is changed from positive to negative and vice versa. The equivalent resistor is connected, as an input resistor to an inverting amplifier, to the input of a differential amplifier. A feedback resistor is connected between the input and output terminals of the differential amplifier. This arrangement provides a rectifier circuit having a gain, even when the differential amplifier used is single in number.

According to the invention, there is provided a rectifier circuit comprising an equivalent resistor with a positive or negative polarity including switches and a capacitor, a level detector circuit to check whether or not the level of an input signal is higher or lower than a predetermined level, and a select circuit for selecting the positive or negative polarity of said equivalent resistor according to the output signal from said level detector circuit.

BRIEF DESCRIPTION OF THE DRAWINGS

FIGS. 6A and 6B respectively show pulse signals on the portions in the circuit of FIG. 5;

FIG. 7 shows a detailed diagram of a circuit which produces the pulse signals shown in FIGS. 6A and 6B;

FIGS. 8A to 8D show the time charts of signals on the respective portions of the circuit of FIG. 7;

DETAILED DESCRIPTION OF THE PREFERRED EMBODIMENTS

Figure 1:
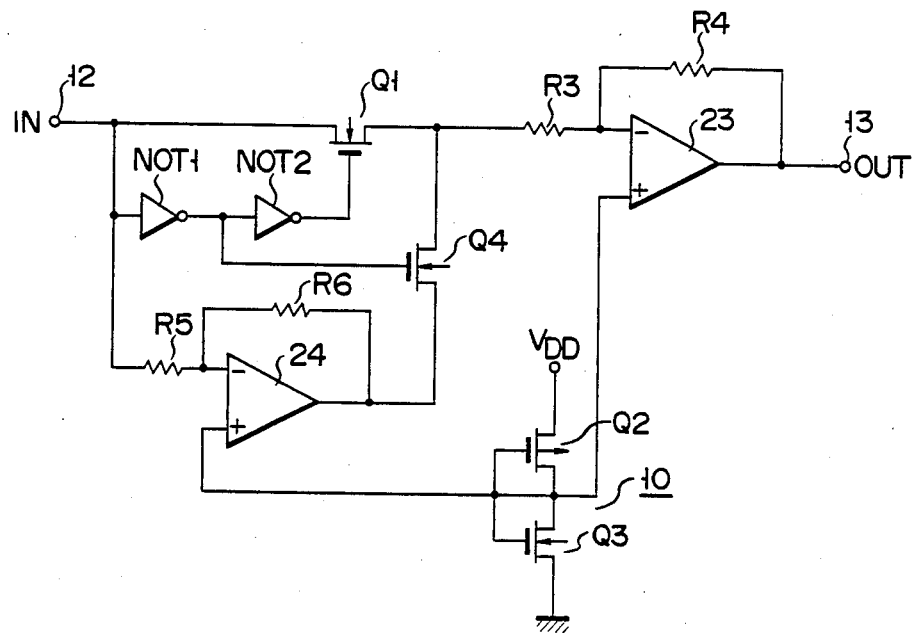
FIG. 1 is a rectifier circuit of a conventional rectifier circuit.
Figure 2:
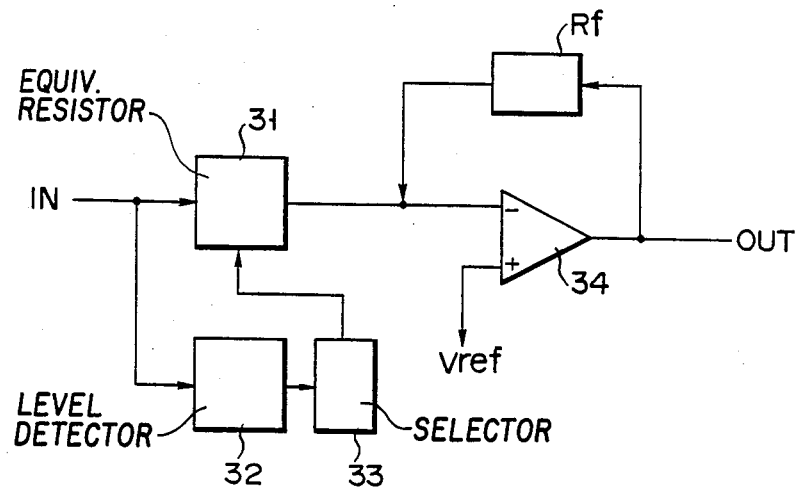
FIG. 2 is a block diagram of a rectifier circuit according to an embodiment of the present invention.
Figure 3:
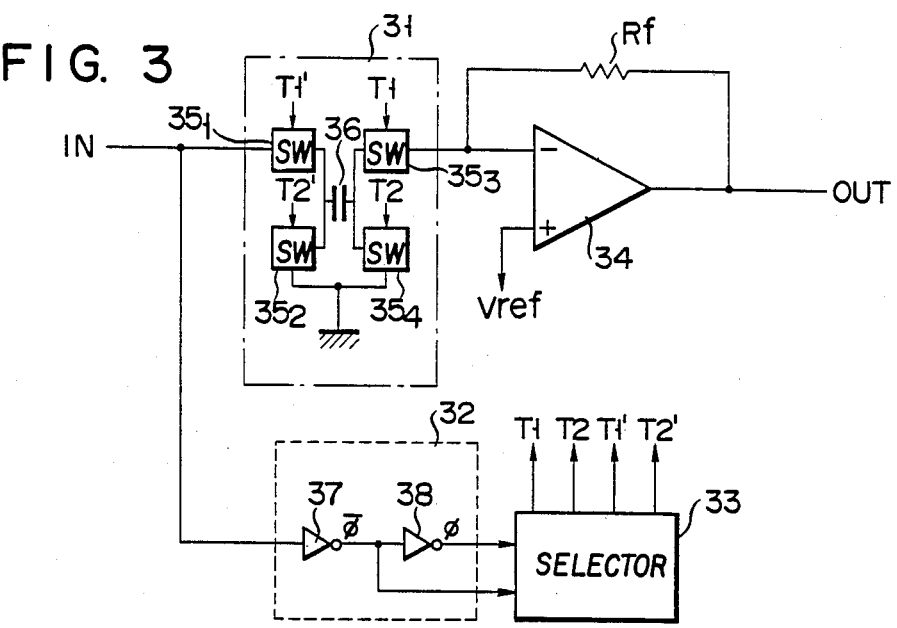
FIG. 3 is a circuit diagram of the circuit shown in FIG. 2.

A preferred embodiment of the present invention will be described referring to the accompanying drawings. FIG. 2 shows a block diagram of the embodiment, and FIG. 3 shows a highly schematic view of the arrangement of that embodiment. In FIGS. 2 and 3, reference numeral 31 designates an equivalent resistor having positive or negative polarity and made up of switches and a capacitor. Numeral 32 designates a level detector to check whether or not an input signal Vin at the input terminal IN is above or below a predetermined level. A select circuit 33 selects the polarity, positive or negative, of the equivalent resistor 31 at the output of the detector 32. A differential amplifier 34 is connected at the inverting input terminal to the other end of the equivalent resistor 31 which receives at one end the input signal Vin. A feedback resistor Rf is connected between the input and output terminals of the differential amplifier 34. The output terminal of the differential amplifier 34 is further connected to the output terminal OUT of the whole circuit.

Figure 4:
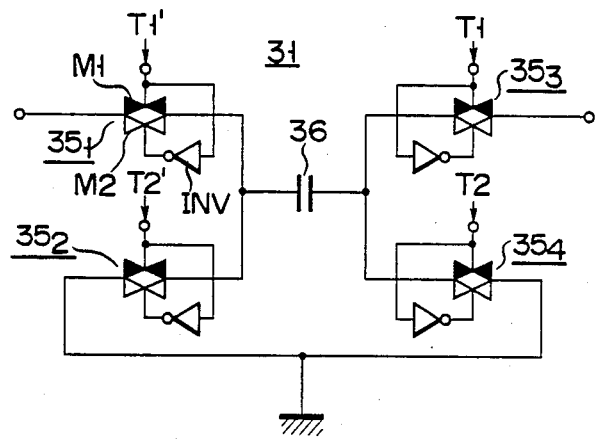
FIG. 4 shows a detailed circuit diagram of the resistor incorporated in the rectifier circuit of FIG. 3.

The equivalent resistor 31 comprises switches $35_1$ to $35_4$ and a capacitor 36, and its detailed circuit is as shown in FIG. 4. As seen in FIG. 4, each of the switches $35_1$ to $35_4$ comprises two MOS (metal oxide semiconductor) transistors M1 and M2 of complementary types connected in parallel and an inverter INV connected across the gates of the MOS transistors. The control pulse signal of the select circuit 33 is directly supplied to the gate of one M1 of the MOS transistors, and is also supplied to the gate of the other M2 of the MOS transistors through the inverter INV. The level detector 32 comprises inverters 37 and 38 as shown in FIG. 3.

Figure 5:
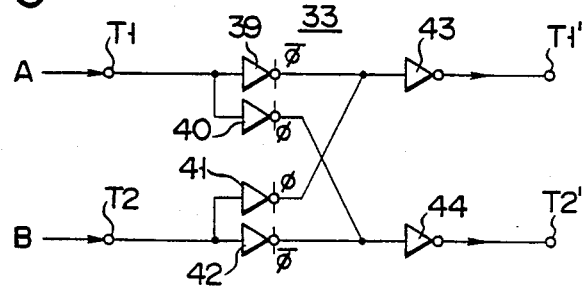
FIG. 5 shows a detailed circuit diagram of the select circuit incorporated in the rectifier circuit of FIG. 3.

The select circuit 33 comprises clocked inverters 39 to 42 and inverters 43 and 44, as shown in FIG. 5. The inverters 39 and 42 are controlled by the clock pulse $\phi$. The inverters 40 and 41 are controlled by the clock pulse $\bar{\phi}$. The input terminals T1 of the inverters 39 and 40 are connected together and are supplied with a pulse signal A, as shown in FIG. 6A, which is supplied to the switch $35_2$ to control the switch $35_2$. The input terminals T2 of the inverters 41 and 42 are connected together and are supplied with a pulse signal B, as shown in FIG. 6B, which is supplied to the switch $35_4$ to control it. The output terminals of the inverters 39 and 41 are connected to the input terminal of the inverter 43. The output terminals of the inverters 40 and 42 are connected to the input terminal of the inverter 44. When the logical level of the clock pulse $\bar{\phi}$ is at a high, the signal A appears on the output terminal T1' of the inverter 43 and the signal B appears on the output terminal T2' of the inverter 44. When the logical level of the clock pulse $\phi$ is high, the signal B appears on the output terminal T1' of the inverter 43 and the signal A appears on the output terminal T2' of the inverter 44. The pulse signals appearing on the output terminals T1' and T2' of the inverters 43 and 44 are respectively supplied to the switches $35_1$ and $35_2$ to control them.

FIG. 7 shows a detailed block diagram of a pulse generator for producing the pulse signals A and B. The block diagram comprises a clock pulse generator 45, a binary counter 46, an inverter 47, a NOR gate 48 and an AND gate 49. An output clock pulse (FIG. 8A) of the clock generator 45 is supplied to the $\overline{CK}$ input terminal of the counter 46 and one input terminal of the NOR gate 48. The Q output terminal of the counter 46 is connected to the other input terminal of the NOR gate 48 and one input terminal of the AND gate 49. An output clock pulse of the clock generator 45 is also supplied to the other input terminal of the AND gate 49 through the inverter 47. The binary counter 45 has the division rate of 2/1 and divides the frequency of the pulse signal of generator 45 by 2/1 to produce a pulse signal Q as shown in FIG. 8B. The NOR and AND gates 48 and 49 respectively produce the output pulse signals A and B as shown in FIGS. 8C and 8D which respectively are identical to the pulse signals A and B shown in FIGS. 6A and 6B.

Figure 9:
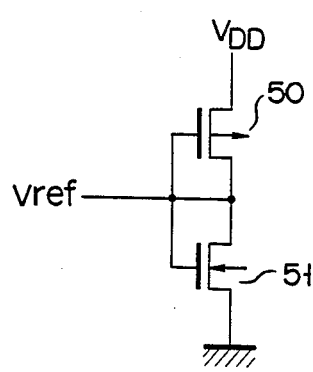
FIG. 9 shows a detailed diagram of a circuit which produces the reference potential Vref.

The generator for generating the reference voltage Vref is composed of a P-channel transistor 50 and an N-channel transistor 51, as shown in FIG. 9.

In the rectifier circuit of FIG. 3, when a potential of an input signal of the input terminal IN is higher than the threshold voltage Vref of the inverter 37, the output signal $\phi$ of the level detector is "H" or high. Under this condition, the signal B appears on the output terminal T1' of the inverter 43 and the signal A appears on the output terminal T2' of the inverter 44. As a result, the equivalent resistor 31 and the capacitor 36 serve as a negative resistor ($-Rs=1/Cf$, where C is capacitance, and f is a clock frequency). The relationship between the input and output of the rectifier circuit is given by $$G = -(-Rf/Rs) = Rf/Rs.$$

The input signal is amplified to have a gain G and outputted at a higher level than the reference voltage Vref. Assuming now that the input voltage is VIN, the output voltage is VOUT, and $Rs=Rf=R$, the output voltage VOUT is $$VOUT = -\left(-\frac{Rf}{Rs}\right) VIN = VIN.$$

When a potential of an input signal to the input terminal IN is lower than the threshold voltage of the inverter 37, $\phi=$"L" or low. Therefore, the signal A appears on the output terminal T1' of the inverter 43 and the signal B appears on the output terminal T2' of the inverter 44. As a result, the equivalent resistor 31 serves as a positive resistor ($Rs=1/Cf$). The relationship between the input and the output is given by $$G = 1(Rf/Rs).$$

The input signal is amplified to have a gain "$-G$", and is outputted at a higher level than that of the reference voltage Vref.

$$VOUT = -(R/R)VIN = -VIN$$

As a result, a full-wave rectified output signal with gain G can be obtained.

Figure 10:
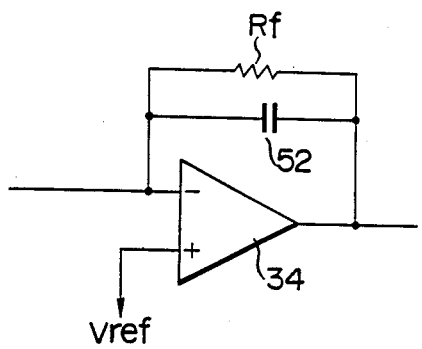
FIGS. 10 to 12 are circuit diagrams of other embodiments of the present invention.

Turning now to FIG. 10, there is shown another embodiment of the present invention. As shown, a capacitor 52 is connected across a feedback resistor Rf to smooth a full-wave rectified output signal.

Figure 11:
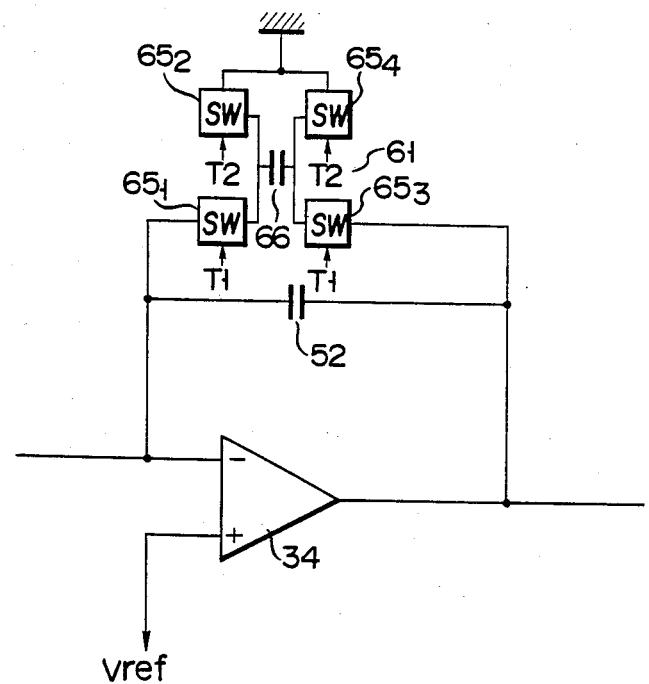

FIG. 11 shows an additional embodiment of the present invention. In cases where the resistance of the equivalent resistor 31 is relatively large, the feedback resistor Rf must have a large resistance. In such a case, a large chip area is required in IC fabrication. To cope with this problem, the feedback resistor Rf is made by an equivalent resistor 61 comprising switches 65₁–65₄ and a capacitor 66.

The structure of the resistor 61 is substantially the same as that of the resistor 31.

Figure 12:
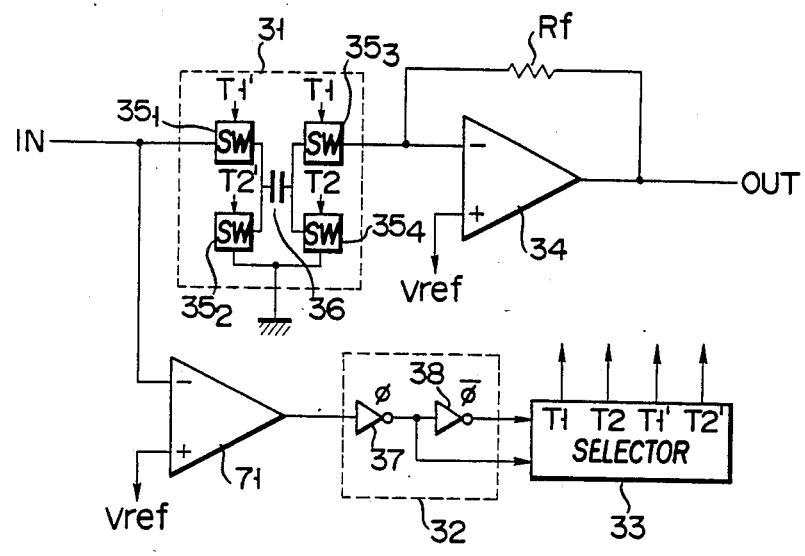

FIG. 12 shows yet another embodiment of the present invention. In the embodiment of FIG. 3, the level detector 32 merely constitutes an inverter. Because of this, the level detector 32 suffers from an offset problem on the output voltage and erroneous operation. Specifically, in such a level detector 32, if the input signal minutely varies in the vicinity of the threshold voltage of the inverter 37, the output voltage VOUT is offset or the detector circuit erroneously operates. To cope with these problems, the embodiment of FIG. 12 additionally uses a comparator 71 provided at the preceding stage of the level detector 32. If this comparator 71 is used, the reference voltage Vref of the level detector can be varied. In the FIG. 12 circuit, like numerals are used for designating like portions in FIGS. 2 and 3.

Figure 13:
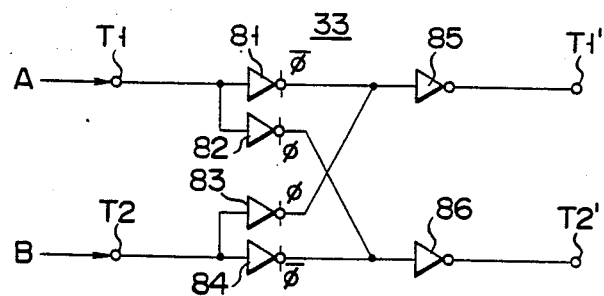
FIG. 13 is a circuit diagram illustrating a part of the FIG. 12 circuit.

FIG. 13 shows the detailed circuit of the select circuit 33 used in the FIG. 12 circuit. As shown, the select circuit is comprised of clocked inverters 81 to 84, and inverters 85 and 86.

It should be understood that the present invention is not limited to the above mentioned embodiments, but may be variously modified and changed within the scope of the invention. For example, in the embodiments as mentioned above, the equivalent resistor 31, the differential amplifier 34, and the resistor Rf are used for obtaining the rectified output signal. The rectifying operation can be attained without use of the differential amplifier 34 and the feedback resistor Rf, if the equivalent resistor is operated as a positive resistor when the input signal level is higher than the reference level Vref, and as a negative resistor in the reverse case.

As seen from the foregoing description, the present invention provides many meritorious effects. The rectifier circuit can be realized by a simple construction. The full wave rectifier circuit can be realized by using a single differential amplifier. In fabricating the rectifier circuit by IC technology, if the feedback resistor of the differential amplifier is made by the equivalent resistor, a desired resistance ratio can be obtained. Accordingly, Rf=1/Cf is attained, and again zero dB or a desired gain can be obtained.

What is claimed is:

1. A rectifier circuit comprising:
   an input terminal for receiving an AC input signal;
   an output terminal for providing a DC output signal;
   a level detector circuit connected to the input terminal for generating a control signal having a logic level indicating whether the input signal is greater than a predetermined level;
   an equivalent resistance circuit connected to the input and output terminals, including,
   a capacitor having a first and a second plate, and switching means that can be set in four modes for coupling the first plate to the input terminal and the second plate to the output terminal when set in a first mode, for uncoupling the first plate from the input terminal and the second plate from the output terminal when set in a second mode, for coupling the first plate to the input terminal and uncoupling the second plate from the output terminal when set in a third mode, and for uncoupling the first plate from the input terminal and coupling the second plate to the output terminal when set in a fourth mode,
   in which alternately setting the switching means in the first and second modes causes the equivalent resistance circuit to function as a positive resistor by charging the capacitor with a current flowing between the scond plate and the output terminal in a single direction at times when the switching means is set in the first mode, and
   in which alternately setting the switching means in the third and fourth modes causes the equivalent resistance circuit to function as a negative resistor by discharging the capacitor with a current flowing between the second plate and the output terminal in said single direction at times when the switching means is set in the fourth mode; and
   select circuit means, responsive to the logic level of the control signal from the level detector circuit, for alternately setting the switching means in the first and second modes at times when the control signal is at one logic level, and for alternately setting the switching means in the third and fourth modes at times when the control signal is at another logic level.

2. A rectifier circuit according to claim 11, further comprising:
   a differential amplifier including an output terminal comprising the output terminal for the rectifier circuit, an inverting input terminal connected to the output of the equivalent resistance circuit, and a non-inverting input terminal connected to a first reference potential; and
   a feedback resistance means connected between the output terminal and inverting input terminal of the differential amplifier.

3. A rectifier circuit according to claim 2, further comprising;
   a feedback capacitor connected in parallel with the feedback resistance means.

4. A rectifier circuit in accordance with claim 2, in which the switching means comprises four switches.

5. A rectifier circuit in accordance with claim 4, and further comprising:
   a first switch coupled between the input terminal and the first plate;
   a second switch coupled between the second plate and the output terminal;
   a third switch coupled between the first plate and a second reference potential; and
   a fourth switch coupled between the second plate and the second reference potential.

6. A rectifier circuit in accordance with claim 5, in which the second reference potential is ground.

7. A rectifier circuit in accordance with claim 5, in which:
   the first switch is closed at times when the switching means is set in the first and third modes;
   the second switch is closed at times when the switching means is set in the first and fourth modes;
   the third switch is closed at times when the switching means is set in the second and fourth modes; and
   the fourth switch in closed at times when the switching means is set in the second and third modes.

8. A rectifier circuit in accordance with claim 7, in which:
   the select circuit means includes means for alternately setting the switching means in the first and second modes at times when the input signal is not greater than the predetermined level and for alternately setting the switching means in the third and fourth modes at times when the input signal is greater than the predetermined level.

9. A rectifier circuit in accordance with claim 3, in which the feedback resistance means comprises:
- a second capacitor having a first and a second plate; and
- a second switching means that can be set in two modes by the select circuit for coupling the first plate of the second capacitor to the output terminal and the second plate of the second capacitor to the inverting input terminal at times when set in a first mode, and for uncoupling said first plate from the output terminal and said second plate from the inverting input terminal at times when set in a second mode;
- in which alternately setting the second switching means in the first and second modes causes the feedback resistance means to function as a positive resistor by charging the second capacitor with a current flowing between the output terminal and the inverting input terminal at times when the second switching means is set in the first mode.

10. A rectifier circuit in accordance with claim 9, in which the first and second plates of the second capacitor are coupled to ground at times when the second switching means is set in the second mode.

11. A rectifier circuit comprising:
- an input terminal for receiving an AC input signal;
- an output terminal for providing a DC output signal;
- a level detector circuit connected to the input terminal for generating a control signal having a logic level indicating whether the input signal is greater than a predetermined level;
- an equivalent resistance circuit connected to the input and output terminals, including,
  - a capacitor having a first and a second plate, and
  - switching means, including a plurality of switches operatively connected to the first and second plates and the input and output terminals, for charging the capacitor with a current flowing between the second plate and the output terminal in a single direction at times when the switching means is set in one of a plurality of modes, and for discharging the capacitor with a current flowing between the second plate and the output terminal in said single direction at times when the switching means is set in another of the plurality of modes,
  - wherein the equivalent resistance circuit has a positive resistance at times when the switching means is set in the one mode, and has a negative resistance at times when the switching means is set in the other mode; and
- select circuit means responsive to the control signal from the level detector circuit, for setting the switching means in the plurality of modes, for setting the switching means in the one mode at times when the control signal is at one logic level, and for setting the switching means in the other mode at times when the control signal is at another logic level.

12. A rectifier circuit in accordance with claim 11, further comprising:
- a signal converter connected to an output terminal of the equivalent resistance circuit and including an output terminal comprising the output terminal for the rectifier circuit for converting an output signal from the equivalent resistance circuit to the DC output signal.

13. A rectifier circuit in accordance with claim 12, in which the signal converter comprises:
- a differential amplifier including an output terminal comprising the output terminal for the rectifier circuit, an inverting input terminal connected to the output of the equivalent resistance circuit, and a non-inverting input terminal connected to a reference potential; and
- a feedback resistance means connected between the output terminal and inverting input terminal of the differential amplifier.

14. A rectifier circuit in accordance with claim 13, in which the switching means includes means for being set by the select circuit in the one mode at times when the input signal is not greater than the predetermined level, and for being set in the other mode at times when the input signal is greater than the predetermined level.

* * * * *